United States Patent [19]
Mirles

[11] Patent Number: 5,573,357
[45] Date of Patent: Nov. 12, 1996

[54] PORTABLE, HANDHELD, POWER TOOL

[75] Inventor: David A. Mirles, Westlake, Ohio

[73] Assignee: Boar Tools, Inc., North Olmsted, Ohio

[21] Appl. No.: 429,947

[22] Filed: Apr. 27, 1995

[51] Int. Cl.⁶ .......................... B23B 45/04; B23B 45/12; B23G 1/16

[52] U.S. Cl. .......................... 408/1 R; 408/123; 408/124; 408/702; 470/67; 470/96

[58] Field of Search .................... 408/1 R, 120, 408/123–125, 702; 470/67, 96

[56] References Cited

U.S. PATENT DOCUMENTS

| | | |
|---|---|---|
| 828,026 | 8/1906 | Garrigus et al. .......................... 408/120 |
| 1,737,431 | 11/1929 | Norling .......................... 470/67 |
| 1,852,776 | 4/1932 | Hodeaux .......................... 470/67 |
| 2,205,148 | 6/1940 | Mayotte .......................... 470/67 |
| 3,350,731 | 11/1967 | Benjamin . |
| 3,521,313 | 7/1970 | Baker . |
| 3,998,565 | 12/1976 | Tanaka . |
| 4,081,873 | 4/1978 | Lemanski . |
| 4,277,209 | 7/1981 | Benjamin et al. . |
| 4,418,767 | 12/1983 | Vindez . |
| 4,705,437 | 11/1987 | Johnson . |
| 4,799,832 | 1/1989 | Abbott . |
| 4,856,946 | 8/1989 | Park .......................... 470/96 |
| 4,915,552 | 4/1990 | Hillestad et al. . |
| 5,346,337 | 9/1994 | Truesdell .......................... 408/1 R |
| 5,354,154 | 10/1994 | Hartley . |

OTHER PUBLICATIONS

Publication entitled 3/8" Air Speed Ratchet Wrench, by Sanborn Manufacturing for a Model No. 024–0039, Publication date unknown but prior to Mar. 1, 1995.

*Primary Examiner*—Steven C. Bishop
*Attorney, Agent, or Firm*—Tarolli, Sundheim, Covell Tummino & Szabo

[57] ABSTRACT

A portable, handheld, power tool is operable to rotate a tap in an opening in a workpiece to form an internal thread convolution in the opening. The power tool includes a chuck which holds the tap. Left and right handles extend in opposite directions from the chuck and are connected with a housing. A motor is disposed in one of the handles and is connected with the chuck by a drive mechanism. Manual actuation of a motor control lever mounted on the one handle initiates operation of the motor. Upon operation of the motor, force is transmitted through a drive mechanism to the chuck to rotate the chuck and the tap. Upon interruption of operation of the motor, the tap may be rotated under the influence of force which is manually applied to the handles.

14 Claims, 4 Drawing Sheets

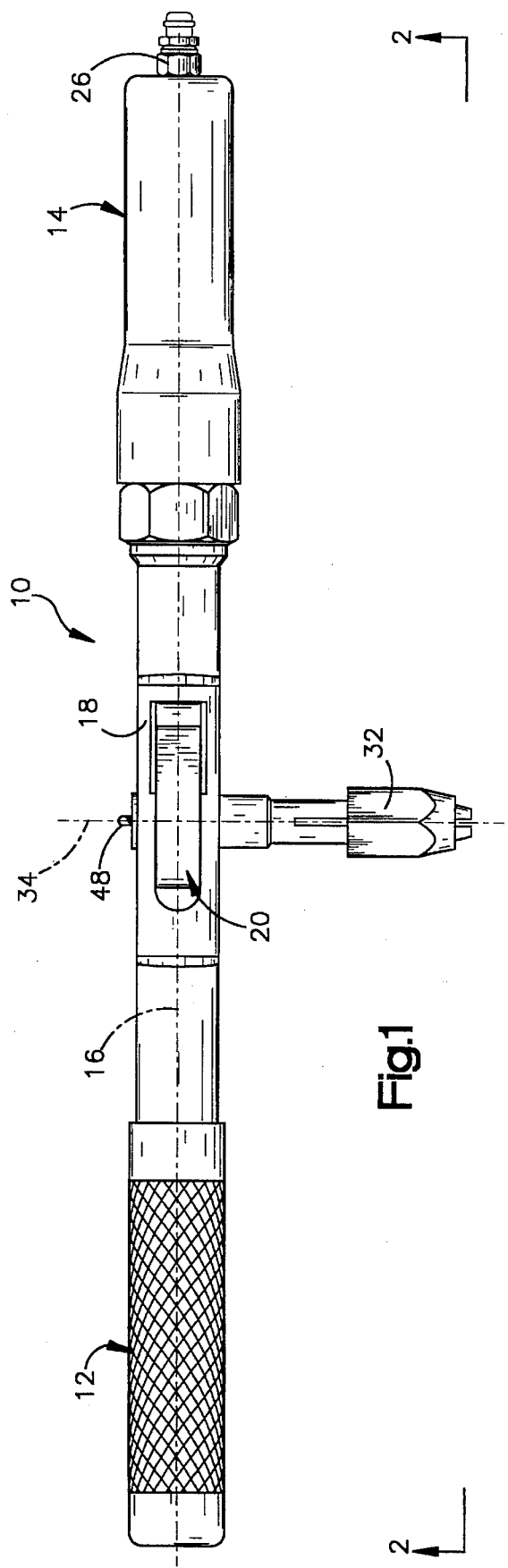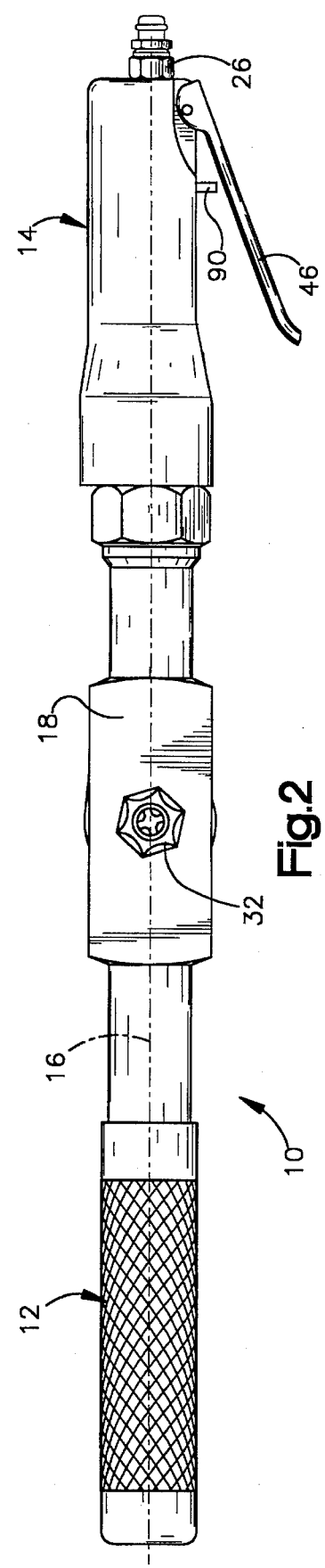
Fig.1
Fig.2

5,573,357

PORTABLE, HANDHELD, POWER TOOL

BACKGROUND OF THE INVENTION

The present invention relates to a portable, handheld, power tool which is used to rotate a tap and thread an opening in a workpiece.

A known tap wrench has a pair of handles which extend in opposite directions from a chuck which holds the tap. When a hole or opening in a workpiece is to be threaded, the tap is aligned with the opening. Force is manually applied against the handles of the wrench to rotate the tap. When the hole or opening has been threaded, the direction of rotation of the tap is reversed to disengage the tap from the opening. A tap wrench having this general construction and mode of operation is disclosed in U.S. Pat. No. 4,799,832.

Power tap units have previously been used in relatively large machines having a construction similar to the construction of a drill press or a milling machine. In order to tap an opening in a workpiece, a machinist must set up the power tapping unit in the machine, bring the workpiece to the machine, and then operate the machine to tap an opening in the workpiece. The configuration and/or size of the workpiece may block access of the known power tapping machine to the opening in the workpiece or may prevent the workpiece from being positioned relative to the machine. This has previously resulted in the use of a manual tap rather than a power tap to form threads in the openings in certain workpieces.

SUMMARY OF THE INVENTION

The present invention relates to a new and improved portable, handheld, power tool for threading an opening in a workpiece with a tap. The power tool includes a chuck which holds the tap. Handles extend in opposite directions from the chuck. A motor is connected with the chuck and is operable to rotate both the chuck and the tap.

The motor is advantageously mounted in one of the handles. A control member is mounted on the one handle and is manually actuatable to effect operation of the motor. It is contemplated that certain embodiments of the invention may mount the motor at a location other than within the handle.

During tapping of an opening in a workpiece, the motor is operated to rotate the tap while an operator grips the handles. Operation of the motor may be interrupted and the tap rotated under the influence of force which is manually applied to the handles.

BRIEF DESCRIPTION OF THE DRAWINGS

The foregoing and other features of the present invention will become more apparent upon a consideration of the following description taken in connection with the accompanying drawings, wherein:

FIG. 1 is a side elevational view of a portable, handheld power tool for threading an opening in a workpiece with a tap;

FIG. 2 is a plan view, taken generally along the line 2—2, further illustrating the construction of the power tool;

DESCRIPTION OF ONE SPECIFIC PREFERRED EMBODIMENT OF THE INVENTION

General Description

Figure 3:
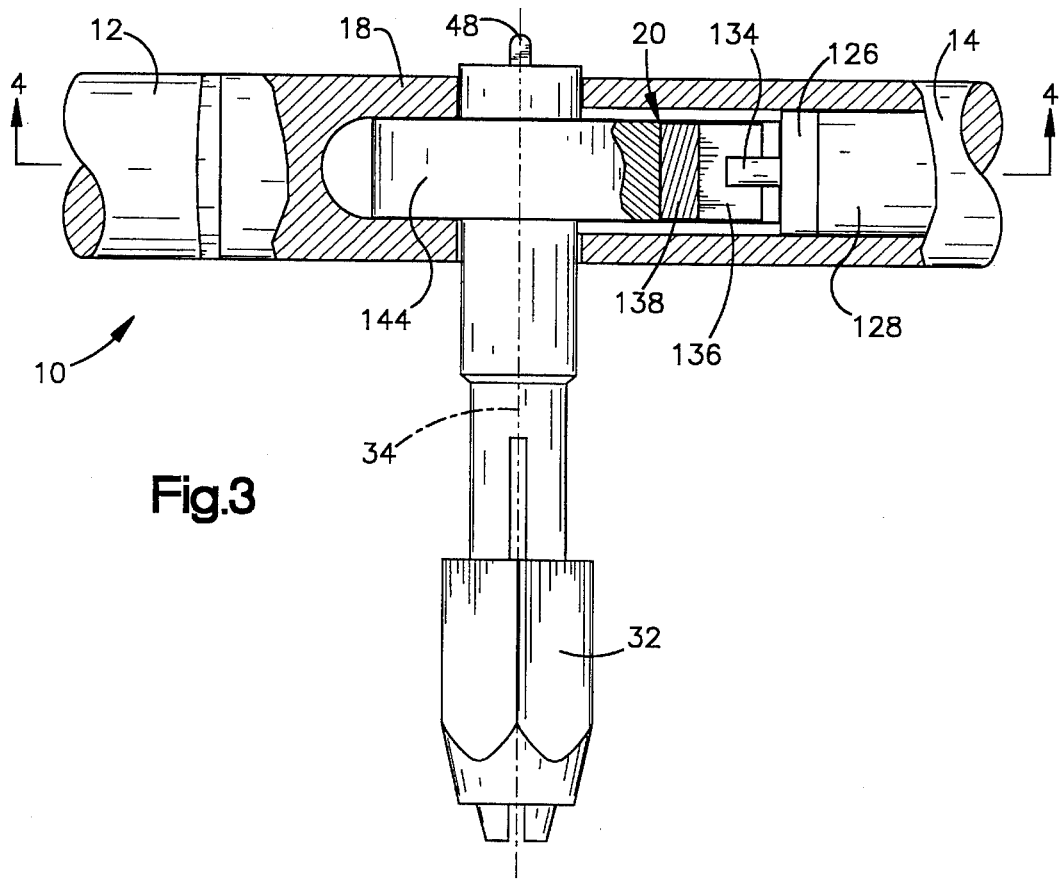
FIG. 3 is an enlarged fragmentary sectional view of a portion of the power tool of FIG. 1 and illustrating the relationship of a drive mechanism to a chuck which holds a tap.
Figure 4:
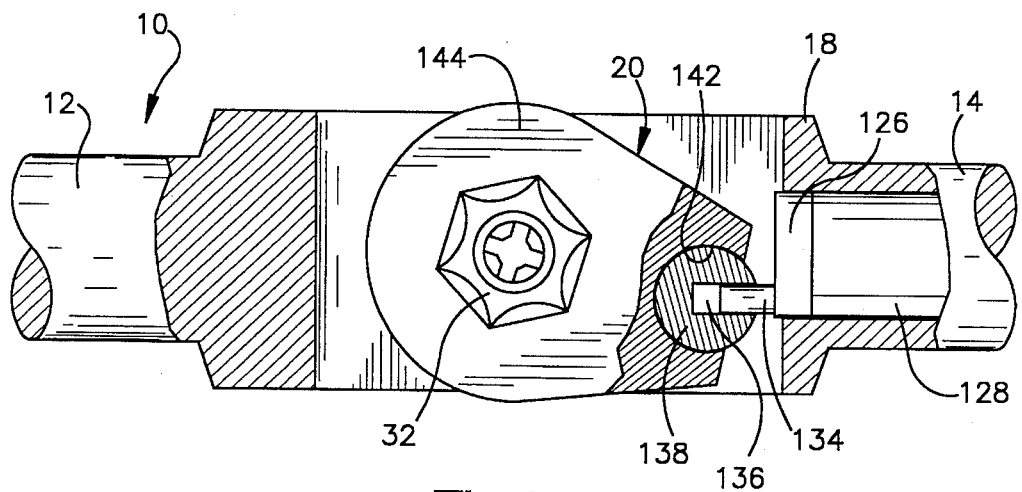
FIG. 4 is a fragmentary sectional view, taken generally along the line 4—4 of FIG. 3, further illustrating the construction of the drive mechanism.

A portable, handheld, power tool 10 for threading an opening in a workpiece with a tap is illustrated in FIGS. 1 and 2. Left and right handles 12 and 14 have central axes which are coincident with a central axis 16 of the power tool 10. A housing 18 interconnects the handles 12 and 14 and partially encloses a drive mechanism 20 (FIGS. 3 and 4).

In accordance with one of the features of the present invention, a motor 24 (FIG. 5) is disposed within the handle 14. In the illustrated embodiment of the invention, the motor 24 is a pneumatic motor which is supplied with air through a conduit (not shown) connected with a fitting 26 on the right handle 14. Although the motor 24 is a pneumatic motor, it is contemplated that an electric motor could be utilized if desired.

When the power tool 10 is to be used, a tap 30 (FIG. 6) is mounted in a chuck 32. The chuck 32 firmly grips the tap for rotation about an axis 34 which is coincident with the axis of rotation of the chuck 32 and extends perpendicular to and intersects the longitudinal central axis 16 of the power tool 10.

The handles 12 and 14 are then manually gripped, that is, the left handle 12 is gripped by the left hand of an operator and the right handle 14 is gripped by the right hand of an operator. The handles 12 and 14 are positioned so that the axis 34 of rotation of the tap 30 is coincident with a central axis of a hole or opening 38 (FIG. 6) in a workpiece 40. With the specific workpiece 40 illustrated in FIG. 6, the central axis 16 of the power tool 10 is parallel to an upper side surface 42 of the workpiece and the axis 34 about which the tap 30 rotates is perpendicular to the upper side surface of the workpiece.

Figure 5:
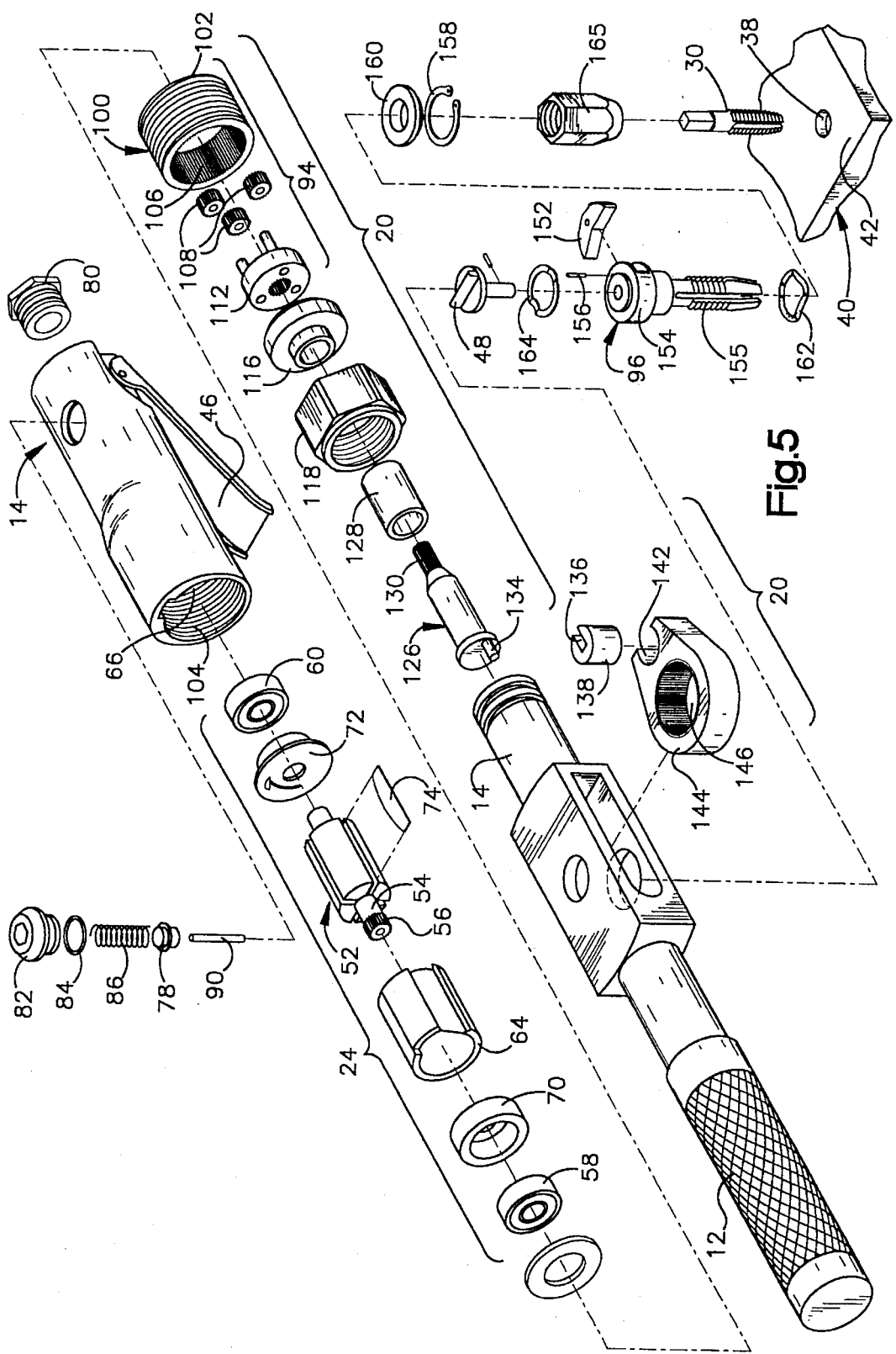
FIG. 5 is an exploded view of the power tool and illustrating the relationship of one of the handles to a motor and drive mechanism which are partially enclosed in the one handle.
Figure 6:
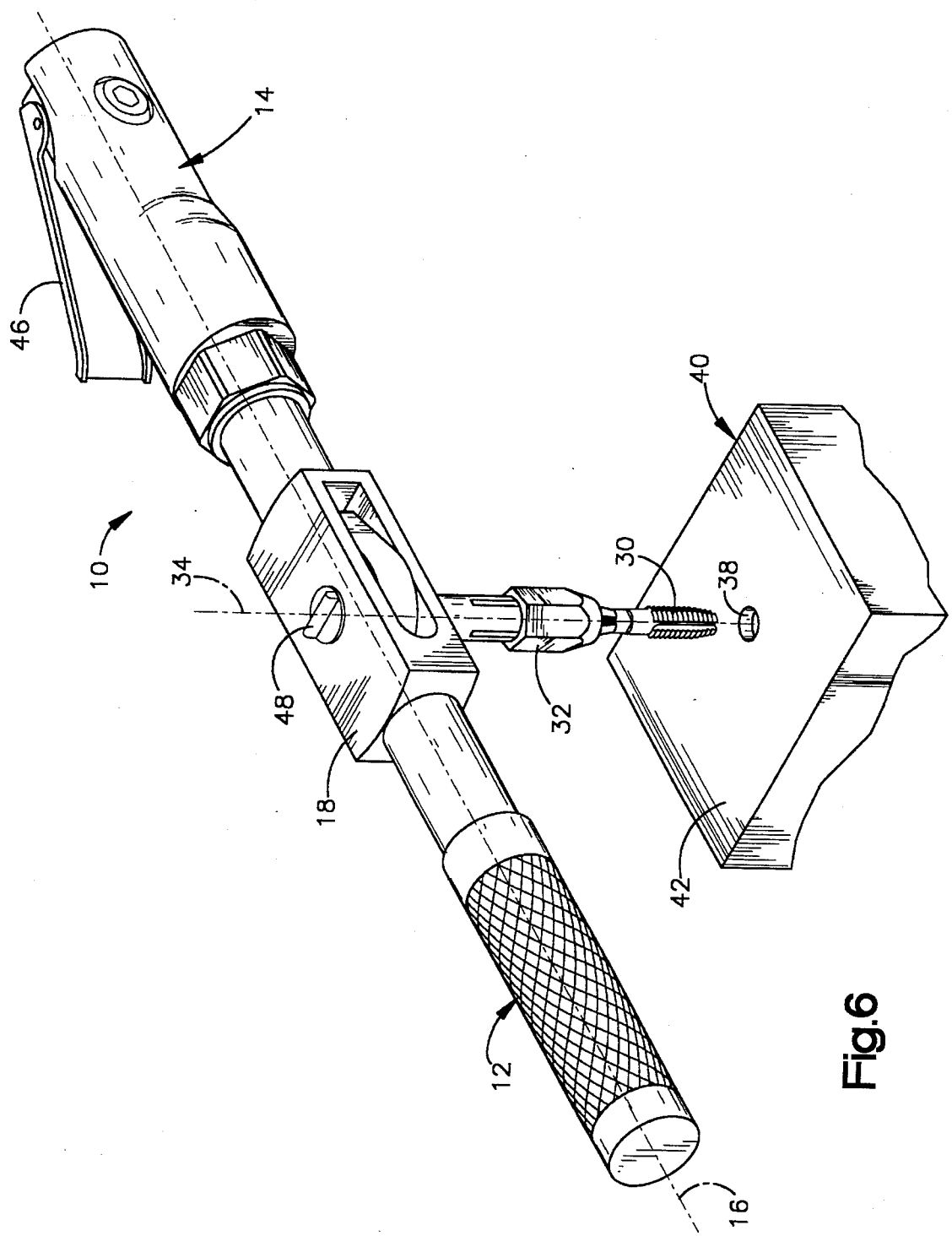
FIG. 6 is a perspective illustration depicting the manner in which the power tool of FIGS. 1–5 is used to thread an opening in a workpiece with a tap.

A motor control lever 46 is then actuated to initiate operation of the motor 24 (FIG. 5). Force is transmitted from the motor 24 through the drive mechanism 20 to the chuck 32 which is connected with the tap 30 (FIG. 6). Operation of the motor 24 rotates the tap 30 in a clockwise direction to form a thread convolution on a cylindrical inner side surface of the hole 38. When the hole 38 has been almost completely threaded, operation of the motor 24 is interrupted and the tap 30 is rotated by manually applying force to the handles 12 and 14. When the hole 38 has been completely tapped, a direction control member 48 is manually actuated to reverse the direction in which the drive mechanism 20 rotates the tap 30 to remove the tap from the hole 38.

Handles

The left and right handles 12 and 14 have a generally cylindrical configuration. The handles 12 and 14 have longitudinal central axes which are coincident with the longitudinal central axis 16 (FIG. 1) of the power tool 10. The handles 12 and 14 extend in opposite directions from the housing 18. Thus, the handle 12 extends toward the left (as viewed in FIG. 1) from the housing 18 while the handle 14 extends towards the right from the housing 18.

The coincident central axes of the handles 12 and 14 extend perpendicular to and intersect the axis 34 about which the chuck 32 rotates the tap 30. Although it is preferred to mount the motor 24 in the handle 14 and to mount the motor control lever 46 on the same handle, it is contemplated that the motor 20 could be mounted in either one of the handles and the motor control lever mounted on the other handle. It is also contemplated that the motor 24 could be mounted at a location other than in a handle.

Motor

In the illustrated embodiment of the invention, the motor 24 is a pneumatic motor and is mounted in the handle 14 (FIG. 5). The motor 24 includes a rotor 52 having an output shaft 54 on which a sun gear 56 is disposed. The central axis of the output shaft 54 and rotor 52 are coincident with the central axis 16 of the power tool 10 and the handle 14. A pair of bearings 58 and 60 support the rotor 52 for rotation about the central axis 16 of the power tool.

The rotor 52 is received in a cylinder 64 which is mounted in a generally cylindrical chamber 66 in the handle 14. Front and rear end plates 70 and 72 engage opposite ends of the cylinder 64 to form a chamber in which the rotor 52 is disposed. Vanes 74 are mounted on the rotor 52 and engage at a cylindrical inner side surface of the cylinder 64 to form working chambers.

An air valve 78 (FIG. 5) is mounted on the handle 14 and controls a flow of air from a conduit connected with the fitting 26 in an end plug 80 on the handle. The air flow control valve 78 is held in the handle 14 by a plug 82 which engages an O-ring 84. A spring 86 urges the air flow control valve inwardly toward the cylinder 64.

A valve actuator pin 90 (FIGS. 2 and 5) is axially movable by manual actuation of the motor control lever 46 to actuate the air flow control valve 78. Thus, upon manual actuation of the motor control lever 46 to move the valve actuator pin 90 axially toward the air flow control valve 78, the air flow control valve is opened. Opening the air flow control valve 78 directs a flow of air under pressure into the motor 24 to rotate the rotor 52 relative to the cylinder 64 and handle 14.

Drive Mechanism

The drive mechanism 20 (FIG. 5) transmits force from the motor 24 to the chuck 32. The drive mechanism 20 includes a gear assembly 94 which is disposed in the handle 14. The drive mechanism 20 also includes a ratchet mechanism 96 which is connected with the chuck 32. The gear assembly 94 reduces a relatively high output speed of the motor 24 to a speed which can be used to actuate the ratchet mechanism 96.

The gear assembly 94 includes a cylindrical ring gear 100 having an externally threaded outer side wall 102 which engages an internal thread convolution 104 in the handle 14 (FIG. 5). The ring gear 100 has internal teeth 106 which are engaged by a plurality of idler gears 108. The idler gears 108 also engage the sun gear 56 on the outer end of the rotor output shaft 54.

The idler gears 108 are carried on an idler gear plate 112. The idler gear plate 112 rotates about a central axis 10 of the ring gear 100 and the central axis 16 of the power tool 10. The central axis of the ring gear 100 is coincident with the longitudinal central axis 16 of the power tool 10.

Upon manual actuation of the motor control lever 46 and operation of the motor 24, the output shaft 54 and sun gear 56 are rotated relative to the stationary ring gear 100. This rotates the idler gears 108 relative to the ring gear 100. As the idler gears are rotated, they orbit in the ring gear 100. This relatively slow orbital rotation of the idler gears 108 results in the idler gear plate 112 being rotated at a relatively slow speed, compared to the output speed of the motor 24, relative to the ring gear 100.

The outer side of the idler gear plate 112 is engaged by a spacer 116 (FIG. 5). A clamp nut 118 is threaded onto the outer end portion of the externally threaded ring gear 100. The clamp nut 118 holds the spacer plate 116 and idler gear plate 112 in place in the ring gear 100.

The drive mechanism 20 includes a motion conversion mechanism which converts the rotary output of the gear assembly 94 to back and forth motion. The motion conversion mechanism includes a crankshaft 126 which is rotatably supported by a cylindrical bushing 128. An inner end 130 of the crankshaft 126 is fixedly connected with the idler gear plate 112. Therefore, the crankshaft 126 rotates about its longitudinal central axis, which is coincident with the longitudinal central axis 16 of the power tool 10, at the same speed as the idler gear plate 112.

An eccentric output pin 134 (FIG. 6) is mounted on the outer end of the crankshaft 126. The cylindrical eccentric pin 134 extends into a slot 136 in a drive bushing 138 (FIGS. 3 and 4). The drive bushing 138 is received in a cylindrical opening 142 (FIGS. 4 and 5) in a yoke or ratchet drive member 144.

Upon rotation of the crankshaft 126 by the gear assembly 94, oscillating motion is imparted to the yoke 144 by the drive bushing 138. This results in the yoke 144 being oscillated through drive and return strokes about the central axis of a cylindrical opening 146 in which the ratchet mechanism 96 is received. Thus, the yoke 144 is moved back and forth, through drive and return strokes, about the axis 34 of the chuck 32 (FIGS. 3 and 4) during operation of the motor 24 (FIG. 5).

The ratchet mechanism 96 functions as a one-way clutch to convert movement of the yoke 144 to a one-way drive which rotates the chuck 32 about the axis 34. When the yoke is moved in one direction, for example, upward as viewed in FIG. 4, the ratchet mechanism 96 is effective to move the chuck 32 and a tap 30 held by the chuck through a drive stroke. Upon movement of the yoke 144 in the opposite direction, that is, downward as viewed in FIG. 4, the ratchet mechanism 96 is ineffective to rotate the chuck 32 and the tap 30. It should be understood that during operation of the motor 24, the rate of movement of the yoke 144 is such that the chuck 32 and tap 30 appear to have continuous rotary movement in one direction relative to the workpiece.

The ratchet mechanism 96 includes a ratchet pawl 152 which is mounted on a chuck anvil 154 by a pin 156. The chuck 32 is connected with the chuck anvil 154. Chuck jaws 155 are connected to the chuck anvil 154. A C-clip or retainer 158 holds a thrust washer 160 and wave spring 162 against the chuck anvil 154. A wave washer 164 is provided between the chuck anvil 154 and the direction control member 48. A chuck adjustment nut 165 engages the chuck jaws 155. The chuck jaws 155 and chuck adjustment nut 165 are part of the chuck 32.

The motor 24 and drive mechanism 20 have a known construction and mode of operation. The construction and mode of operation of the motor 24 and drive mechanism 20 is the same as is used in a ⅜th inch air ratchet wrench which is commercially available from Sanborn Manufacturing, Springfield, Minn. 56087, under Model No. 024-0039. It should be understood that a different motor 24 and drive mechanism 20 could be utilized if desired. For example, the motor 24 could be an electric motor.

Operation

When it is desired to tap a hole or opening 38 in a workpiece 40 (FIG. 6), a proper size tap 30 for the hole 38 is mounted in the chuck 32 of the power tool 10. The operator sets the direction control member 48 to its forward position in which operation of the motor 24 (FIG. 5) results in rotation of the tap 30 (FIG. 6) in a clockwise direction about its axis 34. The operator then grips the left handle 12 with his left hand and the right handle 14 with his right hand.

The operator positions the tap 30 with the leading end of the tap in engagement with the upper end of the hole 38. The operator then positions the handles 12 and 14 relative to the upper side surface 42 of the workpiece 14. The handles 14 and 16 are positioned so that the central axis 16 of the power tool 10 is parallel to the upper side surface 42 of the workpiece 40 and the axis 34 about which the tap 30 is rotated by the chuck 32 is coincident with the central axis of the hole 38. Alignment of the tap 30 with the hole 38 is facilitated by the relatively wide spacing between the handles 12 and 14.

The operator then manually actuates the motor control lever 46 with his right hand. Upon actuation of the motor control lever 46, the valve actuator pin 90 actuates the air valve 78 to direct air under pressure to the motor 24. This air pressure causes the rotor 52 (FIG. 5) to rotate about the central axis 16 of the power tool 10.

Rotation of the rotor 52 results in the sun gear 56 on the end of the rotor output shaft 54 rotating the idler gears 108. Rotation of the idler gears 108 rotates the idler gear plate 112. Rotation of the idler gear plate 112 rotates crankshaft 126 to move the yoke 144.

Movement of the yoke 144 is transmitted to the ratchet mechanism 96. The ratchet mechanism 96 is operable to drive the chuck 32 and tap 30 in one direction, that is in a clockwise direction as viewed in FIG. 6. Clockwise rotation of the tap 30 relative to the hole 38 results in the tap forming a righthand internal thread convolution in the hole.

If the hole 38 is a blind hole and the tap 30 is approaching the end of the hole, the operator will feel an increase in the force which is transmitted to the handles 12 and 14. When the operator feels this force, the motor control lever 46 is released to interrupt operation of the motor 24. The operator then manually rotates the handles 12 and 14 relative to the workpiece 40 to complete the tapping of the hole.

When the operator reaches the end of the blind hole, he actuates the direction control member 48 to reverse the direction in which the ratchet mechanism 96 rotates the chuck 32 and tap 30. The operator then actuates the motor control lever 46 to again operate the motor 24. Since the position of the direction control member 48 has been changed, the direction of rotation of the tap 30 is reversed and the tap rotates in a counterclockwise direction about the axis 34. This results in the tap becoming disengaged from the thread convolution in the hole 38.

Conclusion

The present invention relates to a new and improved portable, handheld, power tool 10 for threading an opening 38 in a workpiece 40 with a tap 30. The power tool 10 includes a chuck 32 which holds the tap 30. Handles 12 and 14 extend in opposite directions from the chuck 32. A motor 24 is connected with the chuck 32 and is operable to rotate both the chuck and the tap 30.

The motor 24 is advantageously mounted in the right handle 14. A control member 46 is mounted on the right handle 14 and is manually actuatable to effect operation of the motor 24. It is contemplated that certain embodiments of the invention may mount the motor 24 at a location other than within the handle 14.

During tapping of an opening 38 in a workpiece 40, the motor 24 is operated to rotate the tap 30 while an operator grips the handles 12 and 14. Operation of the motor 24 may be interrupted and the tap 30 rotated under the influence of force which is manually applied to the handles 12 and 14.

Having described the invention, the following is claimed:

1. A portable, handheld, power tool for threading an opening in a workpiece with a tap, said power tool comprising:

a housing;

a first longitudinally extending handle having an inner end portion connected with said housing and an outer end portion which is spaced from said housing, said first handle having a manually engageable outer side surface with a longitudinal central axis extending through said housing and through said inner and outer end portions of said first handle, said first handle extends away from said housing to said outer end portion of said first handle in a first direction which is parallel to the longitudinal central axis of said manually engageable outer side surface of said first handle;

a second longitudinally extending handle having an inner end portion connected with said housing and an outer end portion which is spaced from said housing, said second handle having a manually engageable outer side surface with a longitudinal central axis extending through said housing and through said inner and outer end portions of said second handle, said second handle extends away from said housing to said outer end portion of said second handle in a second direction which is opposite to the first direction and is parallel to the longitudinal central axis of said manually engageable outer side surface of said second handle;

chuck means for holding a tap, said chuck means being connected with and rotatable relative to said housing about an axis which extends transverse to said longitudinal central axes of said manually engageable outer side surfaces of said first and second handles;

a motor is disposed within said first handle and is enclosed by said manually engageable outer side surface of said first handle, said motor includes a rotor which is rotatable about an axis extending parallel to the longitudinal central axis of said manually engageable outer side surface of said first handle; and a control member connected with said motor and actuatable to effect operation of said motor.

2. A portable, handheld, power tool as set forth in claim 1 wherein said longitudinal central axis of said manually engageable outer side surface of said first handle is coincident with said longitudinal central axis of said manually engageable outer side surface of said second handle.

3. A portable, handheld, power tool as set forth in claim 2 wherein said longitudinal central axes of said manually engageable outer side surfaces of said first and second handles extend perpendicular to and intersect an axis about which said chuck means rotates.

4. A portable, handheld, power tool as set forth in claim 1 wherein said control member is mounted on said first handle and is manually actuatable by an operator of said power tool while the operator is gripping said first and second handles.

5. A portable, handheld, power tool as set forth in claim 1 wherein said motor has an output shaft which is connected with said chuck means and said rotor, said output shaft being rotatable about an axis which extends parallel to the longitudinal central axis of said manually engageable outer side surface of said first handle.

6. A portable, handheld, power tool as set forth in claim 5 wherein said motor is operable to rotate said output shaft in one direction, said power tool further including a manually actuatable member which is movable between a first position in which said chuck means is driven in a first direction by force transmitted from said motor to rotate the tap to form threads in the opening in the workpiece and a second position in which said chuck means is rotated in a second direction by force transmitted from said motor to rotate the tap to disengage the tap from the opening in the workpiece.

7. A portable, handheld, power tool as set forth in claim 1 further including a drive mechanism connected with said motor and said chuck means, said drive mechanism including a drive member which is connected with said motor and is movable through forward and return strokes under the influence of force transmitted from said motor during operation of said motor in one direction, said drive mechanism being operable to rotate said chuck means and said tap during movement of said drive member through forward strokes and being ineffective to rotate said chuck means and said tap during return strokes of said drive member.

8. A portable, handheld, power tool as set forth in claim 1 further including a drive mechanism at least partially disposed in said housing and connected with said motor and said chuck means, said drive mechanism including a drive member which is connected with said motor and is movable in first and second directions under the influence of force transmitted from said motor during operation of said motor, said drive mechanism being operable to rotate said chuck means and said tap during movement of said drive member in the first direction and being ineffective to rotate said chuck means and said tap during movement of said drive member in the second direction.

9. A portable, handheld, power tool as set forth in claim 1 wherein said longitudinal central axis of said manually engageable outer side surface of said second handle extends parallel to the longitudinal central axis of said manually engageable outer side surface of said first handle.

10. A portable, handheld, power tool as set forth in claim 1 wherein said manually engageable outer side surface of said first handle extends at least part way around said rotor of said motor, said motor further including a cylindrical surface which encloses said rotor and is disposed in said first handle, said manually engageable outer side surface of said first handle extends at least part way around said cylindrical surface, and a plurality of vanes which extend between said rotor and said cylindrical surface to form working chambers which receive fluid under pressure upon actuation of said control member to effect operation of said motor.

11. A portable, handheld, power tool as set forth in claim 1 further including first bearing means disposed in said first handle for rotatably supporting a first end portion of said rotor and second bearing means disposed in said first handle for rotatably supporting a second end portion of said rotor, said first and second bearing means being effective to support said rotor for rotation about an axis which is coincident with the longitudinal central axis of said manually engageable outer side surface of said first handle.

12. A portable, handheld, power tool as set forth in claim 1 further including a drive mechanism connected with said chuck means and said motor, said drive mechanism including gear means disposed in said first handle for reducing the output speed of said motor.

13. A portable, handheld, power tool as set forth in claim 12 wherein said gear means includes a ring gear disposed within and connected to said first handle, a sun gear connected with said rotor and disposed within said first handle, and a plurality of idler gears disposed in meshing engagement with said sun and ring gears, said plurality of idler gears being disposed in said first handle.

14. A method of using a portable, handheld, power tool to thread an opening having a closed end disposed in a workpiece, said method comprising the steps of positioning a tap in a rotatable chuck of the power tool, aligning an axis of rotation of the chuck and the tap with a central axis of the opening in the workpiece while gripping first and second handles on the power tool, initiating operation of a motor in the power tool to rotate the chuck and tap relative to the workpiece while gripping the first and second handles, moving a leading end of the tap to a location adjacent to and spaced from the closed end of the opening, interrupting operation of the motor with the leading end of the tap adjacent to and spaced from the closed end of the opening, and thereafter, rotating the tap under the influence of force which is manually applied to the first and second handles while operation of the motor is interrupted to move the leading end of the tap further toward the closed end of the opening.

* * * * *